US006327362B1

(12) United States Patent
Hull et al.

(10) Patent No.: US 6,327,362 B1
(45) Date of Patent: Dec. 4, 2001

(54) SYSTEM AND METHOD INCLUDING DYNAMIC DIFFERENTIAL TREATMENT IN WORKFLOWS AND CONTACT FLOW

(75) Inventors: Richard B. Hull, Morriw Township, Morris County; Bharat Kumar, Scotch Plains; Gang Zhou, Bedminster Township, Somerset County, all of NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/198,232

(22) Filed: Nov. 23, 1998

(51) Int. Cl.[7] ...................................................... H04M 3/00

(52) U.S. Cl. ............................ 379/265; 379/266; 379/309

(58) Field of Search ..................................... 379/265, 266, 379/309, 211, 212

(56) References Cited

U.S. PATENT DOCUMENTS

| 4,503,499 | 3/1985 | Mason et al. | 364/200 |
|---|---|---|---|
| 5,535,322 | 7/1996 | Hecht | 395/155 |
| 5,581,691 | 12/1996 | Hsu et al. | 395/182.13 |
| 5,684,872 | 11/1997 | Flockhart et al. | 379/266 |
| 5,710,921 | 1/1998 | Hirose | 395/676 |
| 5,754,639 | 5/1998 | Flockhart et al. | 379/221 |
| 6,088,444 | * 7/2000 | Walker et al. | . |
| 6,163,607 | * 12/2000 | Bogart et al. | 379/266 |

* cited by examiner

Primary Examiner—Creighton Smith (57) ABSTRACT

Computer and telecommunication systems employing workflow (contact flow) processes are enhanced by employing dynamic random differential treatment of so-called instances (contacts) entering the workflow (contact flow). This is realized, for example, by associating a prescribed distinguishing function with the workflow (contact flow), and to use a value given by this prescribed distinguishing function in one or more decisions relating to how the object instance (contact) should be processed. Each decision is essentially a choice between two or more paths in a workflow (contact flow), or a choice between two or more workflows (contact flows). For example, the prescribed distinguishing function could associate a distinguishing value having an integer value between 1 and 100 with object instances (contacts), and a selection function for making a decision to use one or more of a plurality of workflows (contact flows) is related to a prescribed parameter "x" that has a value from 0 to 100. For example, each object instance (contact) with a prescribed distinguishing value$\leq$x is routed to a first of the plurality of possible treatments and each object instance (contact) with distinguishing value>x is routed to at least another of the plurality of possible treatments. Additionally, dynamic control is utilized over the parameters employed by the selection function that control whether object instances (contacts) are routed to the first treatment or to some other treatment. For the preceding example, this is accomplished by permitting dynamic control over the value of prescribed parameter x. This dynamic control is effected either manually or automatically. In a particular embodiment of the invention, dynamically controlled differentiation is realized by associating a random number (or other randomly chosen value) with each object instance (contact), and to use this random number in one or more decisions relating to how the object instance (contact) should be processed. That is, a randomized differentiator is utilized as the dynamically controlled differentiator.

76 Claims, 7 Drawing Sheets

SYSTEM AND METHOD INCLUDING DYNAMIC DIFFERENTIAL TREATMENT IN WORKFLOWS AND CONTACT FLOW

TECHNICAL FIELD

This invention relates to the processing of work items and, more particularly, to processing of work flows and customer care treatments.

BACKGROUND OF THE INVENTION

In computer and telecommunication systems workflow control processes are employed to control the flow of work items. A workflow is a specification of how a class of object instances (contacts), for example, insurance claims, orders for parts or service, requests for a change in status of an account, requests for transfer of funds or the like, should be handled. A special kind of workflow arises in customer care centers, in the handling of customer contacts that arrive to the customer care center (inbound contacts) or depart from a customer care center (outbound contacts); these workflows are called contact flows or contact treatments. A specific kind of contact flow involves call treatment centers in handling calls either arriving or departing from the call treatment center; i.e., call flows or call treatments.

In prior known systems, workflows (contact flows, respectively) permit the specification of alternative treatments for instances (contacts), based on their relevant properties, on external inputs associated with the instances, and the system environment (e.g., load, status of connectivity or the like). However, these known prior systems do not provide support for giving different treatments to instances (contacts) that have identical properties, identical external inputs, and that enter the system at times where the system environment is substantially the same.

A particular problem in call centers concerns switching the call handling policy from one call flow to another one. In prior known call centers this is typically accomplished only by a discreet, complete transfer from the currently deployed call flow to a new call flow. If there is a bug or inefficiency in the new call flow, then the switchover to the new call flow might cause problems that irritate many customers, or cause the system to come down.

Any such occurrences are extremely unsatisfactory from a system provider's viewpoint.

Another problem with prior systems concerns the reaction of a customer contact center to changing load and environmental conditions. Indeed, in the prior systems, changing the customer contact treatment for a given percentage of the customer contacts in response to load or condition changes had been performed entirely by manual procedures. Use of such manual procedures is inefficient.

SUMMARY OF THE INVENTION

The problems and limitations of prior known computer and telecommunication systems employing workflow (contact flow) processes are addressed by employing dynamically controlled differential treatment of so-called object instances (contacts) entering the workflow (contact flow). This is realized, for example, by associating a prescribed distinguishing function with the workflow (contact flow), and to use a value given by this prescribed distinguishing function in one or more decisions relating to how the object instance (contact) should be processed. Each decision is essentially a choice between two or more paths in a workflow (contact flow), or a choice between two or more workflows (contact flows). For example, the prescribed distinguishing function could associate a distinguishing value having an integer value between 1 and 100 with object instances (contacts), and a selection function for making a decision to use one or more of a plurality of workflows (contact flows) is related to a prescribed parameter "x" that has a value from 0 to 100. For example, each object instance (contact) with a prescribed distinguishing value$\leq x$ is routed to a first of the plurality of possible treatments and each object instance (contact) with distinguishing value$>x$ is routed to at least another of the plurality of possible treatments. Additionally, dynamic control is utilized over the parameters employed by the selection function that control whether object instances (contacts) are routed to the first treatment or to some other treatment. For the preceding example, this is accomplished by permitting dynamic control over the value of prescribed parameter x. This dynamic control is effected either manually or automatically.

In summary, a dynamically controlled differentiation functionality is realized by employing three logical components: component (1) a distinguishing function which, for example, assigns a distinguishing value between 0 and 100 to each relevant object instance (call) entering the workflow (call flow); component (2) a selection function, that maps the events to two or more distinct treatments, based on a case statement involving the distinguishing value; and component (3) a parameter control function that permits either manual or automatic real-time modification of the parameters used in the selection function.

In a particular embodiment of the invention, dynamically controlled differentiation is realized by associating a random number (or other randomly chosen value) with each object instance (contact), and to use this random number in one or more decisions relating to how the object instance (contact) should be processed. That is a randomized differentiator is utilized as the dynamically controlled differentiator.

To this end, the randomized differentiator functionality is realized by employing three logical components: component (1) generates a random number for each object instance (call) entering the workflow (call flow); component (2) evaluates a selection function involving the random number, and routes the object instance (contact) to the appropriate choice; and component (3) permits real-time modification of the parameters used in the selection function.

In a specific embodiment of the invention, so-called "incremental phase-in" is employed to incrementally replace a first workflow (call flow) treatment with some other workflow (call flow) treatment.

In another embodiment of the invention the distinguishing function is based on some aggregate quality or usefulness of the object instance (contact) to the handling enterprise, e.g., the "business priority" of the object instance (contact).

In still another embodiment of the invention, automatic load balancing is employed between workflow (call flow) treatments.

In yet another embodiment of the invention, the impact or value is compared of two (or more) different treatments for incoming instances (calls).

In one more embodiment of the invention, the selection function between workflow (call flow) treatments does not occur at the initiation of object instances (contacts), but instead occurs at some point in time after initiation of the object instance (contact) and only for a selected class of object instances (contacts), e.g., only for gold card holders living in New Jersey.

DETAILED DESCRIPTION

Briefly, a "workflow" is a specification of how a class of object instances (contacts) (e.g., insurance claims, orders for parts or service, requests for change in status of accounts, new accounts, a request for transfer of funds, or the like) should be handled. A workflow might be specified on paper as a set of procedures and policies to be followed. However, in many applications one or more computers are used to control the flow of events in handling relevant object instances (contacts); in such an example, the workflow is specified using a computer programming language such as C++, Java, or the like, or a machine specific programming language such as the vector language used for a DEFINITY® digital switch, some other proprietary language used for PBXs or voice response units, or perhaps a higher-level, more specialized workflow management language. In either situation, at an abstract level workflows are generally specified as directed graphs, e.g., flowcharts, decision trees, Petri nets, interaction control nets, or the like, that indicate how items entering the workflow should be handled, including indications of what choices should be made in the flow process. Additionally, it is typical for computerized workflow management systems to control other software and hardware components in their processing, and to guide any human interaction in the process.

A special type of workflow arises in contact (e.g., call) centers, in handling calls that arrive at the call center (inbound calls) or depart from the call center (outbound calls); these workflows are called call flows or call treatments. A call flow may also specify that different types of calls be treated differently at certain points in the call flow process. A significant difference between traditional workflows and call flows is that workflow can be processed over some time interval of minutes, days, weeks, etc., whereas most call flows occur in near real time. This is because call flows are typically executed while a customer, client or the like, is on line waiting for some kind of service or information, and because any delay in connecting the customers, clients, or the like to call center attendants may be an extremely inefficient use of the attendant's time and very annoying to the customer, client or the like.

Note that for brevity and clarity of exposition, the embodiments of the invention described hereinafter are related to call flows. However, it will be apparent to those skilled in the art that the invention is equally applicable to other workflow arrangements and to other customer care centers. Such customer care centers may support both inbound and outbound customer contacts such as, for example, multimedia access, internet and/or web-based access, facsimile, electronic mail, interaction among multiple parties or the like.

Figure 1:
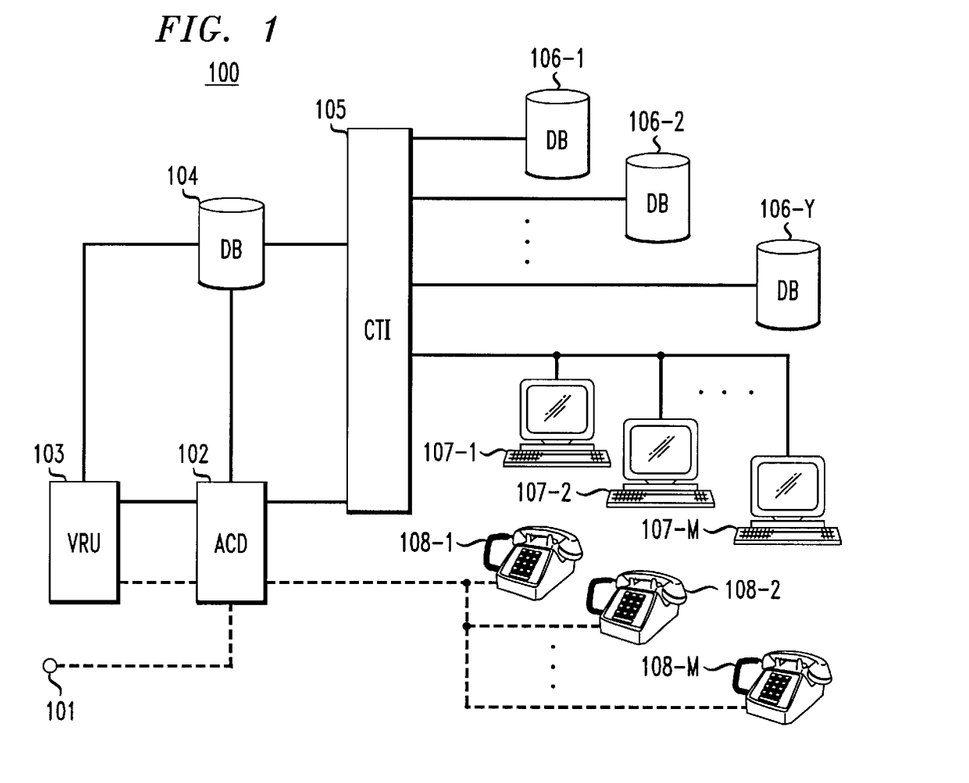
FIG. 1 shows, in simplified block diagram form, details of a customer contact processing center (e.g., a call processing center) employing an embodiment of the invention.

FIG. 1 shows, in simplified block diagram form, details of a customer contact processing center (e.g., a call processing center) employing an embodiment of the invention. Specifically, shown in FIG. 1 is a call processing center 100 including input 101 to which incoming calls are supplied and, then, routed to Automatic Call Distribution (ACD) center 102. ACD 102 would typically be implemented in a private branch exchange (PBX), for example, a DEFINITY® digital switch commercially available from Lucent Technologies Inc. Associated with ACD 102 are Voice Response Unit (VRU) 103, for example, a CONVERSANT® voice response unit also commercially available from Lucent Technologies Inc., database 104, Computer Telephony Interaction (CTI) unit 105 and a plurality of attendant telephones 108-1 through 108-N. Associated with CTI 105 are one or more database units 106-1 through 106-Y and attendant display units, e.g., personal computers (PCs), 107-1 through 107-M. In this embodiment, the invention would typically be implemented in CTI 105.

Call center 100 may support several inbound telephones numbers, for example, having prefix 800 or 888. In a typical call center application, a Domain Number Identification Service (DNIS) is used to provide mapping between each inbound call and an initial starting point for the call flow or treatment associated with calls addressed to the inbound telephone number. Each such call flow is considered to be an integral part of an overall call that specifies how all of the inbound and outbound calls for the center are treated. In one example, in a DEFINITY switch, the call flow associated with an inbound call is specified using a set of vectors (i.e., specialized programs). The set of vectors includes a so-called "root" vector that serves as the starting point for processing calls supplied to an inbound telephone number. The DNIS provides a mapping between the inbound telephone numbers and the root vectors associated on a one-to-one basis to the inbound telephone numbers. Each root vector is specified using a Vector Directory Number (VDN).

In another example of implementing call center 100, call flows are specified by using a collection of flowcharts or similar graph-based structures, and by using a generic computer to ensure that calls are treated according to the flowcharts. Note that some of the operations set forth in the flowcharts may invoke functions that are separate from the flowchart, or calls to external components, for example, a Voice Data Unit (VDU) or a database. Indeed, a flowchart describing a call flow or family of call flows may be specified using a graphical front-end or using a programming language such as C++ or Java, or some proprietary programming language. Call processing centers are known in the art, which do not include the dynamically controlled differentiation of call treatments employed in the embodiments of the invention described herein.

Figure 2:
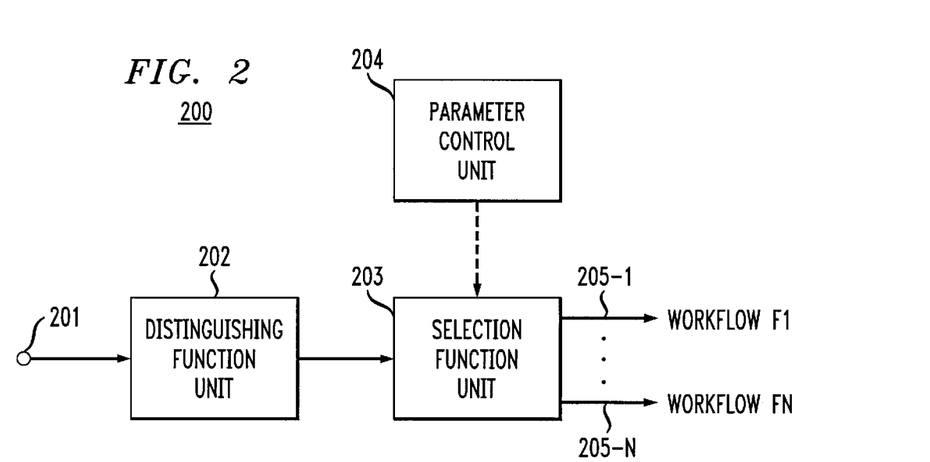
FIG. 2 is a functional diagram illustrating an embodiment of the invention.

The invention can be implemented in many different ways depending on the particular kind of workflow and/or call flow center infrastructure. A central idea of an implementation of the invention is the notion of employing a "dynamically controlled differentiator" functionality into the workflow or call flow. FIG. 2 is a functional diagram illustrating an implementation of an embodiment of the invention including a dynamically controlled differentiator, in accordance with the invention. Specifically, shown, are input 201 to which incoming calls are directed and, then, routed to distinguishing function unit 202. Distinguishing function unit 202 generates a distinguishing value, for example, a distinguishing value related to a priority or some other attribute of a call and assigns it to an incoming call. Note each individual incoming call gets its own distinguishing value assigned to it. In this example, the distinguishing function generates, for example, a distinguishing value that is an integer from 1 to 100. However, any desired lower and upper bound on the integers can be used. The assigned distinguishing value is placed into a field of the call object, e.g., the field identified as "call.distinguishing_value". Thereafter, the call including its distinguishing function is supplied to selection function unit 203, which is a selection function for associating individual calls from a range of distinguishing values to individual ones of a set of possible workflows F1 through FN, namely 205-1 through 205-N, respectively. Selection function unit 203 bases a decision as to how an individual workflow is selected for a call based on, for example, a predicate over the distinguishing value assigned to the call. This predicate might be, for example, "call.distinguishing_value≦x", which is a prescribed predicate and where "x" is a prescribed parameter. Parameter control unit 204 provides manual or automatic real-time modification of the parameters used in the selection function.

By way of an example, if parameter "x" is 5, then the predicate is TRUE for 5 percent (%) of the calls, and the predicate is False for the other 95% of the calls. Thus, in this example, a selected one of workflows (call flows) F1 through FN, is employed to process 5% of the calls and another different selected workflow is used to process the remaining 95% of the calls. In this example, dynamic control unit 204 is employed to dynamically control parameters used in the selection function. Thus, in this example, the controlled parameter is "x", i.e., the percentage of calls for which the predicate is TRUE. The controlled parameter can be modified dynamically, either automatically by other processes or manually by human management of the process.

In another example, the distinguishing function can be related to a priority level attributed to the specific type of call, the type of customer (client or the like), the importance of the customer or its related business, or the like. Thus, priority levels greater than a prescribed parameter value would be provided a first call treatment while priority levels equal to or less than the prescribed parameter value would be provided some other call treatment. Indeed, a plurality of different call treatments may be provided by appropriately delineating priority level bands into which the predicate may fall into. For example, a plurality of call flows can be assigned on a one-to-one basis to a corresponding plurality of priority level bands of the prescribed parameter x.

It will be apparent to those skilled in the art that a plurality of parameterized predicates can be employed to select the particular treatment that a call will get. The predicates could define one or more boundaries each of which is assigned to a corresponding workflow (call flow) or one or more paths within a workflow (call flow). For example, the selection function could select between N treatments using conditions such as, $1 \leq \text{call.distinguishing\_value} \leq p(1)$, or $p(1) < \text{call.distinguishing\_value} \leq p(2)$, or $p(2) < \text{call.distinguishing\_value} \leq p(3)$, or . . . $p(N-1) < \text{call.distinguishing\_value} \leq p(N)$. It is further noted that the parameter(s) used in the selection function do not have to be integers. The distinguishing value may be representative, for example, of a distinguishing number, a random number, a priority level, a specific type of call, customer contacts, or the like.

In call center 100 as shown in FIG. 1 that is controlled by, for example, a DEFINITY switch, the basic process is implemented in CTI 105, i.e., an adjunct router. Specifically, for an inbound number where call flows are to be controlled, for example, via incremental phase-in from one workflow (call flow) to another workflow (call flow), described below, the root vector, e.g., "Vector A", for the inbound number causes control to be passed to CTI 105. The dynamically controlled differentiator 200 (FIG. 2) is included in CTI 105. Routing to a first call flow, e.g., F1 or to the other call flow, e.g., F2, is realized as follows: calls assigned to F1 are routed to a vector, e.g., "Vector B", on the DEFINITY switch that serves as the root vector of F1. Once control is 100% passed from F1 to F2, the DNIS mapping for the inbound number is modified to hold the VDN of Vector C so that calls to this inbound number are routed directly to Vector C.

Additionally, call center 100 of FIG. 1, in situations where call flows are specified using flowcharts, call flows for different inbound telephone numbers are typically specified using distinct flowcharts. Then, the DNIS provides a mapping from the inbound telephone numbers to the root of the flowchart that specifies how calls to the inbound telephone number are to be processed.

Figure 3:
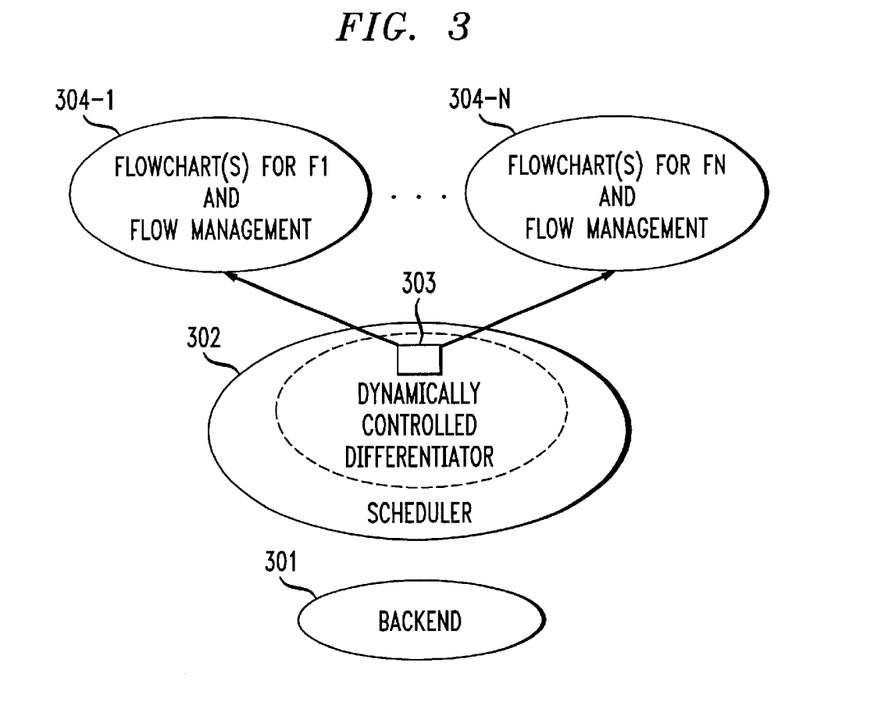
FIG. 3 is a functional diagram showing details of one implementation of an embodiment of the invention.

FIG. 3 is a functional diagram showing details of a flowchart approach for specifying call flows in one implementation of an embodiment of the invention. The approach toward implementation of FIG. 3 in based on compilation of the flowcharts. Thus, there is a so-called backend 301 that manages the telephony switching fabric in, for example, the DEFINITY switch. Also included is scheduler 302, which includes code specifying dynamically controlled differentiator 303. The dynamically controlled differentiator code and software that processes inbound calls, together with one or more flowcharts, are compiled into a single body of executable machine code, shown as flowchart(s) for F1 and Flow Management 304-1 through flowchart(s) for FN and Flow Management 304-N.

Figure 4:
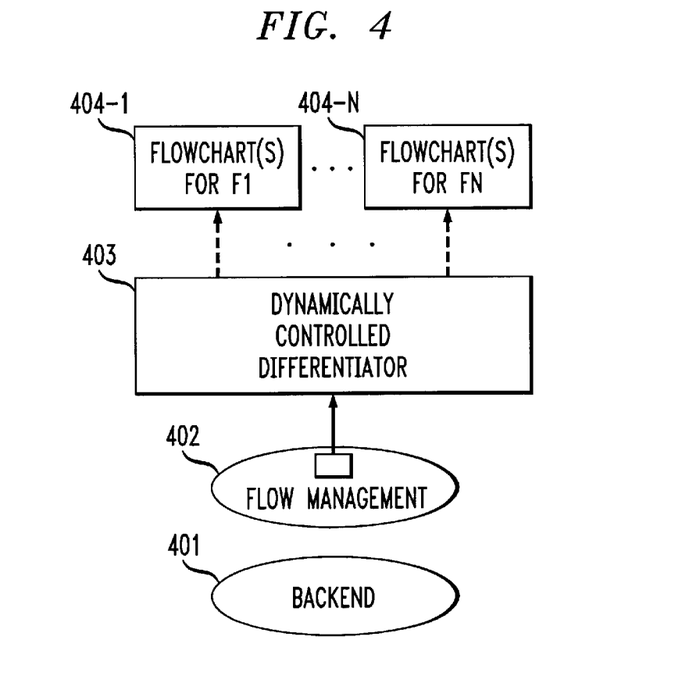
FIG. 4 is a functional diagram showing details of another implementation of an embodiment of the invention.

FIG. 4 is a functional diagram showing details of another flowchart approach for specifying call flows in an implementation of an embodiment of the invention. The approach toward implementation of FIG. 4 in based on interpretation of the flowcharts. Thus, there is a so-called backend 401 that manages the telephony switching fabric in, for example, the DEFINITY switch. Software modules for processing inbound calls are compiled into executable machine code, called "Flow Management" 402. The flowcharts are converted into data structures that are interpreted by flow management 402 machine code. Flow management 402 includes code specifying dynamically controlled differentiator 403. As, with the compiled approach, the dynamically controlled differentiator code is compiled as part of the flow management module, and holds as data the values of parameters of the predicate used in the dynamically controlled differentiator 403. The dynamically controlled differentiator 403 code and software that processes inbound calls, together with Flow Management 402 code, are compiled into a single body of executable machine code, shown as flowchart(s) for F1 404-1 through flowchart(s) for FN 404-N. Another approach to implementing the invention in the interpreted approach is to embed the logic of the dynamically controlled differentiator 403 into a flowchart.

Figure 5:
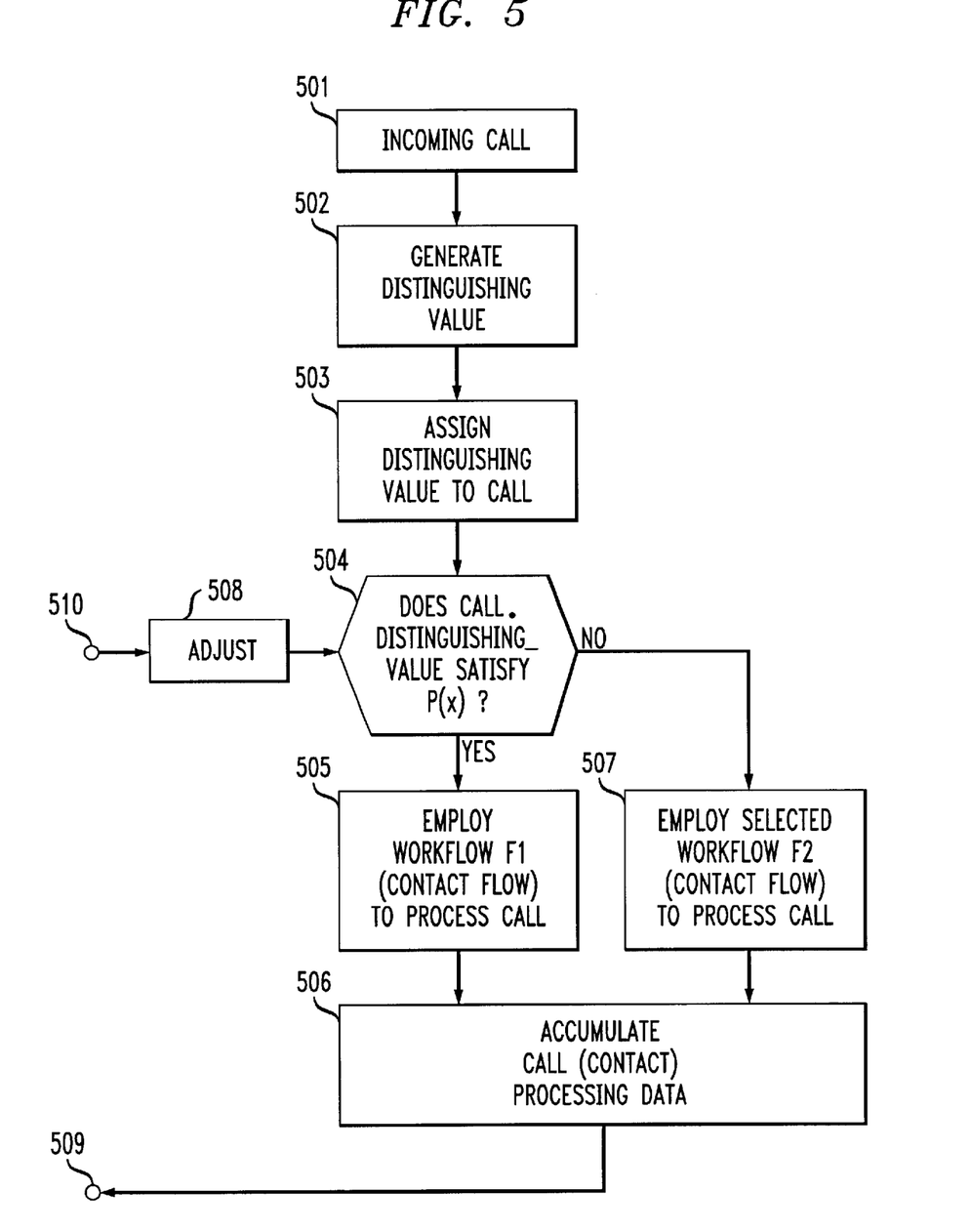
FIG. 5 is a flowchart illustrating steps in the operation of an embodiment of the invention.

FIG. 5 is a flowchart illustrating steps in the operation of another embodiment of the invention. The process is begun in response to an incoming call in step 501. Thereafter, step 502 generates a distinguishing value. Step 503 maps the distinguishing value to the incoming call to form "call.distinguishing_value". Step 504 tests to determine if call.distinguishing_value satisfies p(x), where "p" is a prescribed predicate with one parameter and "x" is a prescribed parameter. If the test result in step 504 is YES, control is transferred to step 505 and workflow (contact flow, call flow) F1 is employed to process the call. Then, in step 506 call (contact) processing data is accumulated and supplied as an output via 509. If the test result in step 504 is NO, control is transferred to step 507 and a selected workflow (contact flow, call flow) F2 is employed to process the call. Then, in step 506 call (contact) processing data is accumulated and supplied as an output via 509. The data accumulated in step 506 may be employed by an attendant to adjust the parameter "x" as desired to increase or decrease the number of incoming call selected to utilize F2. This is effected in step 508 by adjusting the value of parameter p used in step 504.

Figure 6:
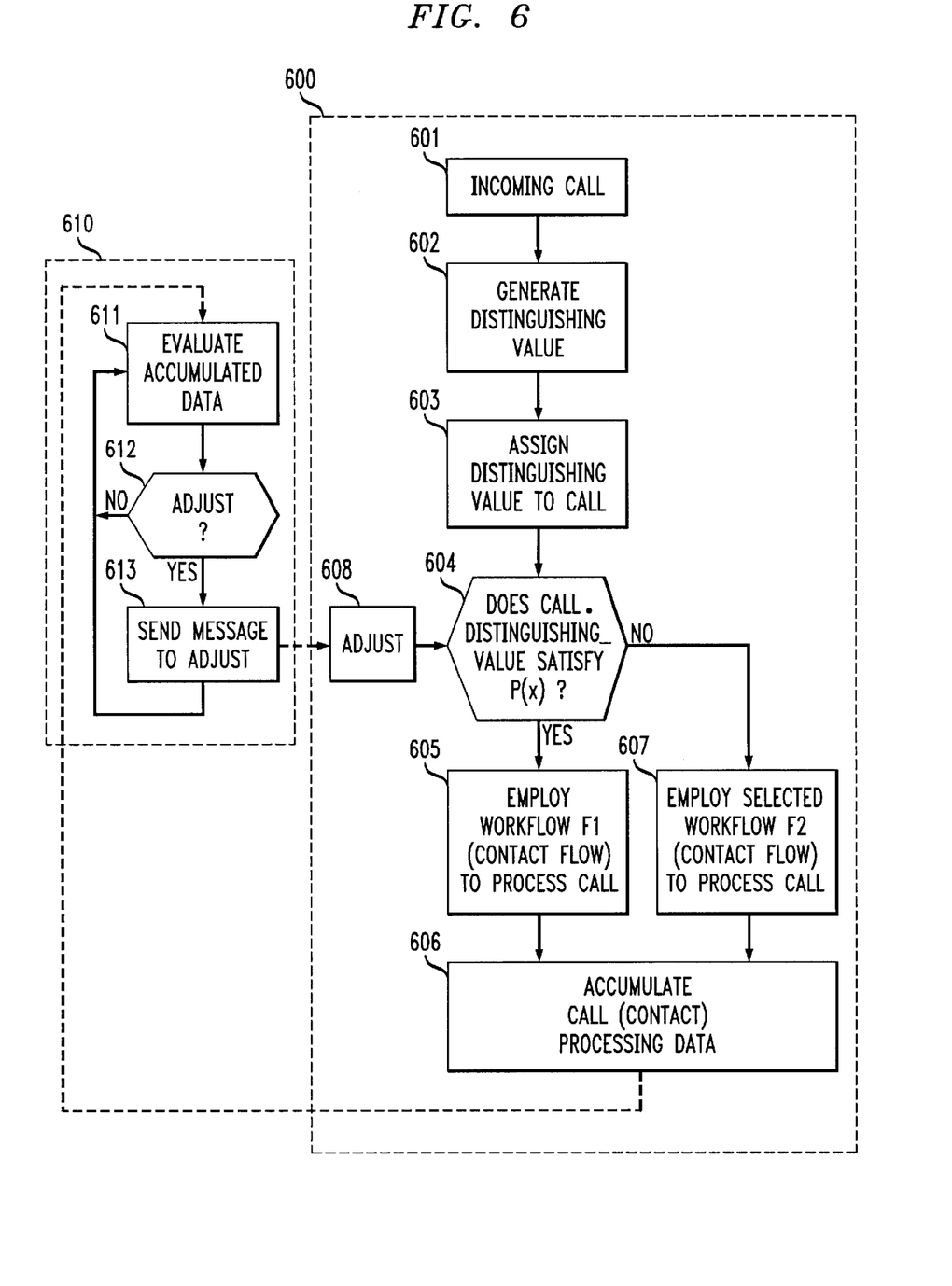
FIG. 6 is a flowchart illustrating steps in the operation of another embodiment of the invention.

FIG. 6 is a flowchart illustrating steps in the operation of still another embodiment of the invention. The treatment selection module 600 includes steps 601 through 608, and the treatment selection process is begun in response to an incoming call in step 601. Thereafter, step 602 generates a distinguishing value. Step 603 assigns the distinguishing value to the incoming call to form "call.distinguishing_value". Step 604 tests to determine if call.distinguishing_value satisfies p(x), where "p" is a prescribed predicate having one parameter and "x" is a prescribed parameter. If the test result in step 604 is YES, control is transferred to step 605 and workflow (contact flow, call flow) F1 is employed to process the call. Then, in step 606 call (contact) processing data is accumulated and supplied to step 611 in automatic adjustment module 610. If the test result in step 604 is NO, control is transferred to step 607 and a selected workflow (contact flow, call flow) F2 is employed to process the call. Then, in step 606 call (contact) processing data is accumulated and supplied to step 611 in automatic adjustment module 610. The data accumulated in step 606 is evaluated in step 611 to determine whether a change in parameter x used in the predicate should be effected. Then, step 612 tests to determine if parameter x used in the predicate should be adjusted in accordance with prescribed criteria based on the evaluation in step 611. If the test result in step 612 is No, control is returned to step 611 and steps 611 and 612 are iterated until step 612 yields a YES result. The YES result in step 612 indicates that prescribed parameter x used in the predicate should be adjusted, and step 613 sends a message to step 608 indicating that prescribed parameter x used in the predicate is to be adjusted in a prescribed manner to effect a desired treatment of the incoming calls. Note that the processes of treatment selection module 600 and adjustment module 610 run concurrently.

In one application of the invention there is a controlled, incremental replacement of a first call flow F1 for an inbound number by another call flow F2 for the inbound number. The replacement can be effected manually by an attendant (FIG. 5) or automatically by a control loop (FIG. 6). In the manual mode, a call center attendant can specify, at any given time, what percentage of calls should be treated using call flow F1 and what percentage of the calls should be treated using call flow F2. For example, the attendant can start with 99% of the calls being treated by call flow F1 and 1% being treated by call flow F2. If the calls treated by call flow F2 come to a satisfactory conclusion, then the attendant may choose to increase the percentage of the calls treated by F2 to for example, 2%, and gradually up to 100%. However, if at some point in time inefficiencies or bottlenecks arise because of call flow F2, then the percentage of calls treated by F2 can be reduced to, for example, 0%. In the automatic mode, the replacement of F1 by F2 can be effected by employing some arbitrary mechanism to select the percentages of the calls to be treated by F1 and F2. The percentage adjustments are readily realized by adjusting parameter "x" used in the predicate either up or down as the situation may call for.

In another application, an embodiment of the invention is used as a part of an automated feedback loop which controls how calls are treated in a call center, based on the load of the call center. Consider a simple example in which a call center has only one inbound number and employs two possible call flows, F1 and F2, for treating the calls. F1 requires 5 database dips per call and F2 requires only one (1) database dip per call. The call center attendant prefers F1 to treats calls, but sometimes the call volume is so high that the underlying database would be overloaded if all calls were treated by F1. In such a situation, it is appropriate to treat some calls by F1 and other calls by F2. Now consider the inequality, $$\text{max\_load} > \text{number\_calls} \ (5x/100 + (1-x)/100),$$

in which "max_load" denotes the maximum number of database dips per minute that the database can support, "number_calls" denotes the current number of calls per minute coming into the call center, and prescribed parameter "x" denotes the percentage of calls being treated by F1. To use the call center optimally, the value of prescribed parameter x should be chosen such as to maximize the value of the right side of the above inequality, without exceeding the left side. Solving for parameter p in terms of number calls yields $$x < 25(\text{max\_load}/\text{number\_calls}) - (\tfrac{1}{4}).$$

Consequently, an automatic feed-back loop can be established, which monitors the number of calls per minute coming into the call center, and adjusts the value of parameter x in order to satisfy the inequality as narrowly as possible. Furthermore, a distinguishing function may be employed that assigns, for example, the function "business_value" to incoming calls, where business_value is a number from 1 to 100 and is uniformly distributed over the incoming calls. Alternatively, a random number generator could be employed to generate a random number which represents the distinguishing function. As is well known, random numbers are uniformly distributed.

In addition to handling all inbound calls entering the call center by a given telephone number to select among a plurality of call flows, the invention is also useful in selecting between so-called "sub-call" flows that specify alternative treatments for call not specifically defined by an inbound telephone number. By way of an example, let F1 be a selected call flow and G1 be a portion of F1 that specifies the treatment of "platinum card" calls. The invention is also useful in providing an extended, controlled comparison of relative benefits of, for example, G1 versus some other sub-call flow G2. Again, by way of an example, let some percentage, e.g., 10%, of platinum card calls be treated by G1, and the remaining portion, i.e., 90%, be treated by G2 over some time interval, for example, several days, and comparing the results of using the two different treatments. Indeed, the invention can also be used to provide an incremental phase-in of one sub-call flow (G2) for another (G1), while leaving the remainder of F1 unaffected.

Figure 7:
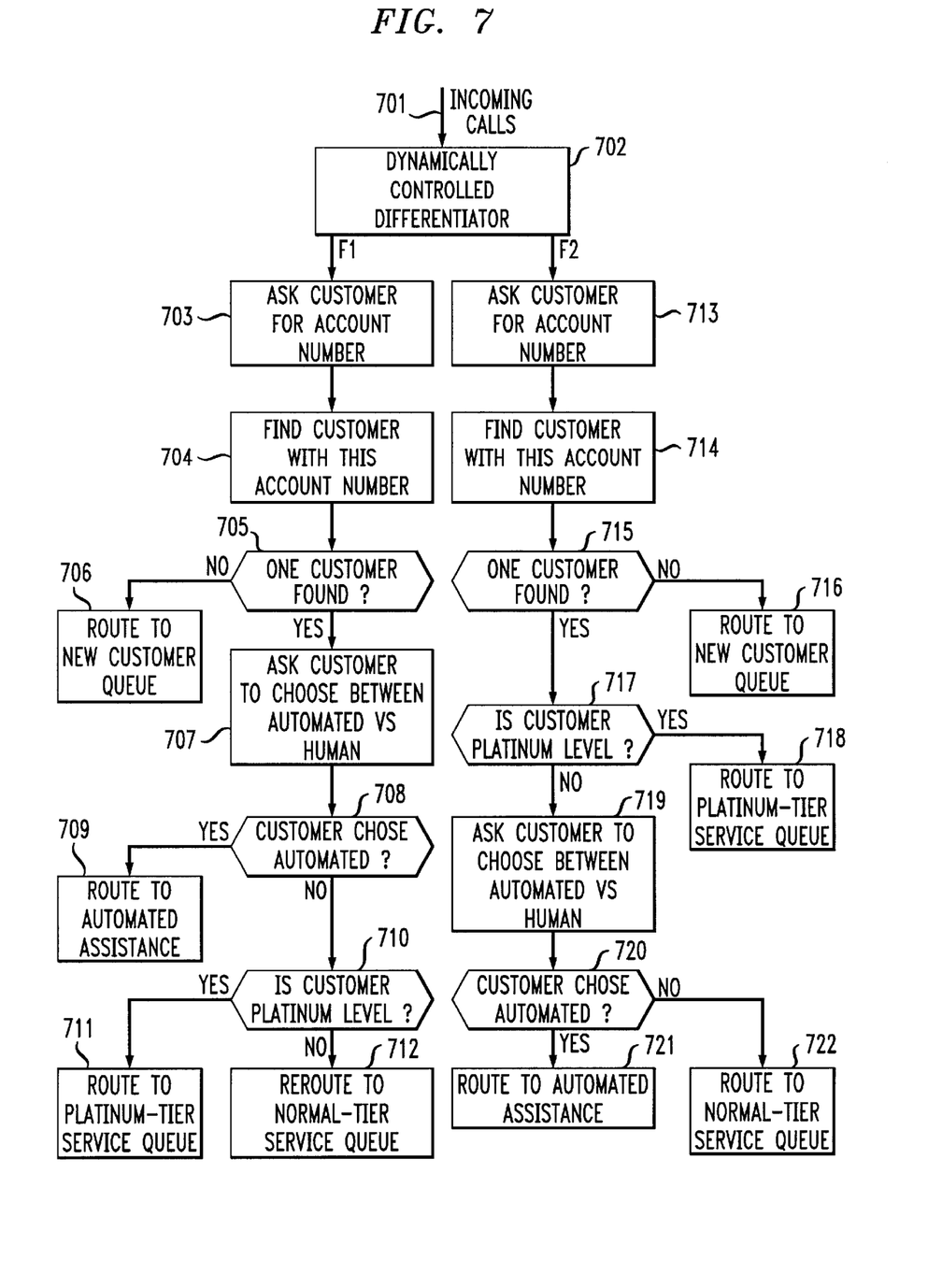
FIG. 7 is a flowchart illustrating the steps in a first example call treatment employing an embodiment of the invention.

FIG. 7 is a flowchart illustrating the steps in a first example call treatment employing an embodiment of the invention. In step 701 an incoming called is received and supplied to dynamically controller differentiator step 702. In step 702, an embodiment of the invention, for example, the randomized differentiator 900 shown in FIG. 9, selects a call flow, e.g., F1 or F2, which is to be employed to treat the call. If F1 is selected control is transferred to step 703 and the caller, i.e., customer, is asked for his/her account number. In step 704, a database searches to find the customer with the account number. Step 705 tests to determine if one customer was found. If the test result in step 705 is NO, control is transferred to step 706 and the caller is routed to a new customer queue. If the test result in step 705 is YES, control is transferred to step 707 and the customer is asked to choose between automated or human processing. Then, step 708 tests to determine if the customer chose automated. If the test result in step 708 is YES, control is transferred to step 709 and the customer is routed to automated assistance. If the test result in step 708 is NO, control is transferred to step 710 which tests to determine if the customer is at a "platinum" level. If the test result in step 710 is YES, control is transferred to step 711 and the customer is routed to platinum tier service queue. If the test result in step 710 is NO, control is transferred to step 712 and the customer is routed to normal tier service queue. Returning to step 702, if call flow F2 is selected to treat the call, control is transferred to step 713, which asks the calling customer his/her account number. In step 714, a database searches to find the customer with the account number. Step 715 tests to determine if one customer was found. If the test result in step 715 is NO, control is transferred to step 716 and the caller is routed to a new customer queue. If the test result in step 715 is YES, control is transferred to step 717, which tests to determine if the calling customer is at a platinum level. If the test result in step 717 is YES, control is transferred to step 718 and the customer is routed to platinum tier service queue. If the test result in step 717 is NO, control is transferred to step 719 which causes the customer to be asked to choose between automated or human processing. Then, step 720 tests to determine if the customer chose automated processing. If the test result in step 720 is YES, control is transferred to step 721 and the customer is routed to automated assistance. If the test result in step 720 is NO, control is transferred to step 722 and the customer is routed to a normal tier service queue.

Figure 8:
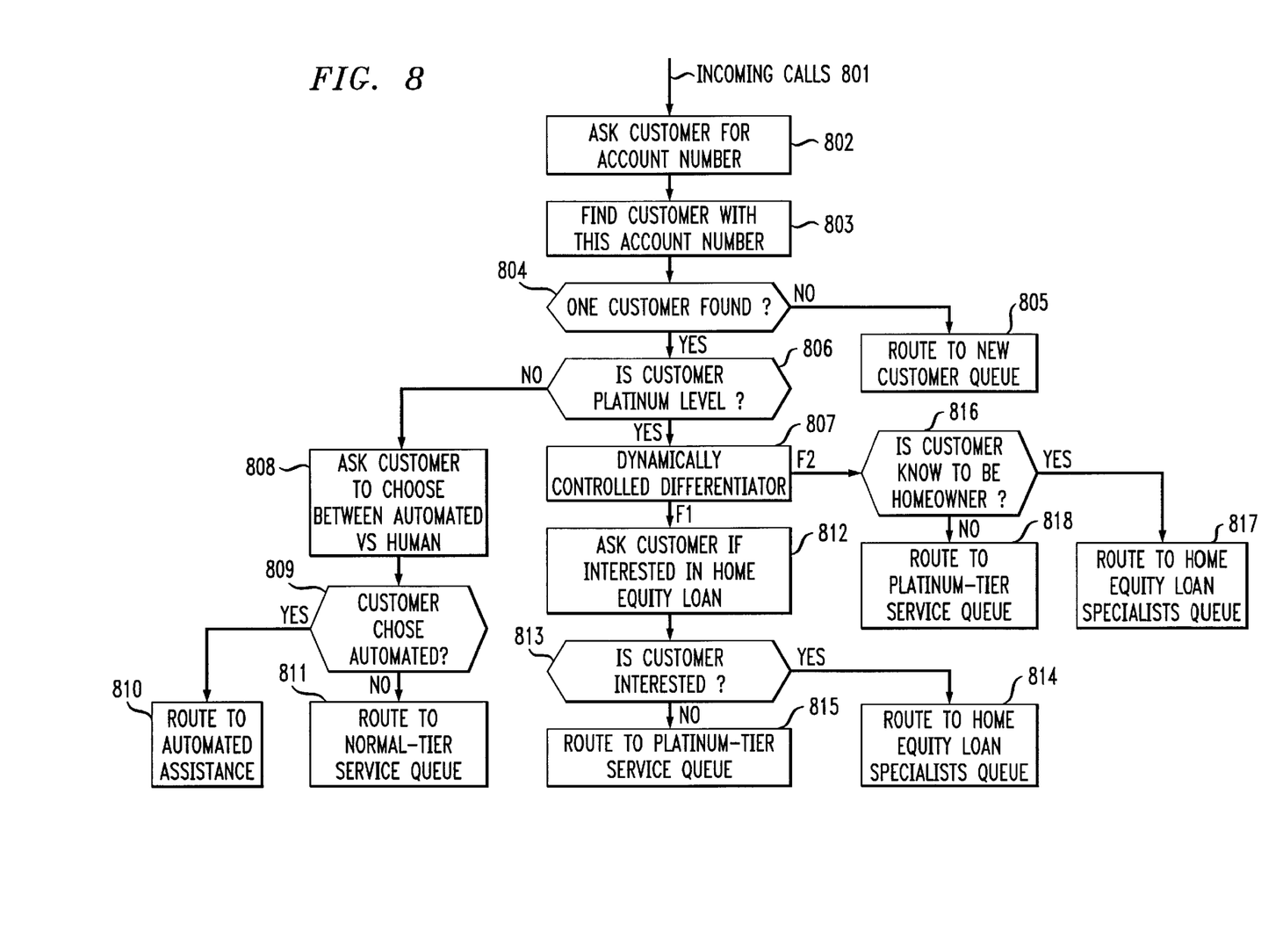
FIG. 8 is a flowchart illustrating the steps in a second example call treatment employing an embodiment of the invention.

FIG. 8 is a flowchart illustrating the steps in a second example call treatment employing an embodiment of the invention. In step 801 an incoming called is received and supplied to step 802 and the caller, i.e., customer, is asked for his/her account number. In step 803, a database searches to find the customer with the account number. Step 804 tests to determine if one customer was found. If the test result in step 804 is NO, control is transferred to step 805 and the caller is routed to a new customer queue. If the test result in step 804 is YES, control is transferred to step 806 which tests to determine if the customer is at a platinum level. If the test result in step 806 is NO, control is transferred to step 808 which causes the customer to be asked to choose between automated or human processing. Then, step 809 tests to determine if the customer chose automated processing. If the test result in step 809 is YES, control is transferred to step 810 and the customer is routed to automated assistance. If the test result in step 809 is NO, control is transferred to step 811 and the customer is routed to a normal tier service queue. Returning to step 806, if the test result is YES, control is transferred to dynamically controller differentiator step 807. In step 807, an embodiment of the invention, for example, randomized differentiator 900 of FIG. 9, selects a call flow, e.g., F1 or F2, which is to be employed to treat the call. If F1 is selected control is transferred to step 812 and the caller, i.e., customer, is asked if he/she is interested, for example, in obtaining a home equity loan. Then, step 813 tests to determine if the customer is interested in obtaining a home equity loan. If the test result in step 813 is YES, control is transferred to step 814 and the customer is routed to a home equity loan specialist queue. If the test result in step 813 is NO, control is transferred to step 815 and the customer is routed to a platinum tier service queue. Returning to step 807, if call flow F2 is selected to treat the call, control is transferred to step 816. Step 816 tests to determine if the customer is known to be a homeowner. If the test result in step 816 is YES, control is transferred to step 817 and the customer is routed to a home equity loan specialist queue. If the test result in step 816 is NO, control is transferred to step 818 and the customer is routed to a platinum tier service queue.

Figure 9:
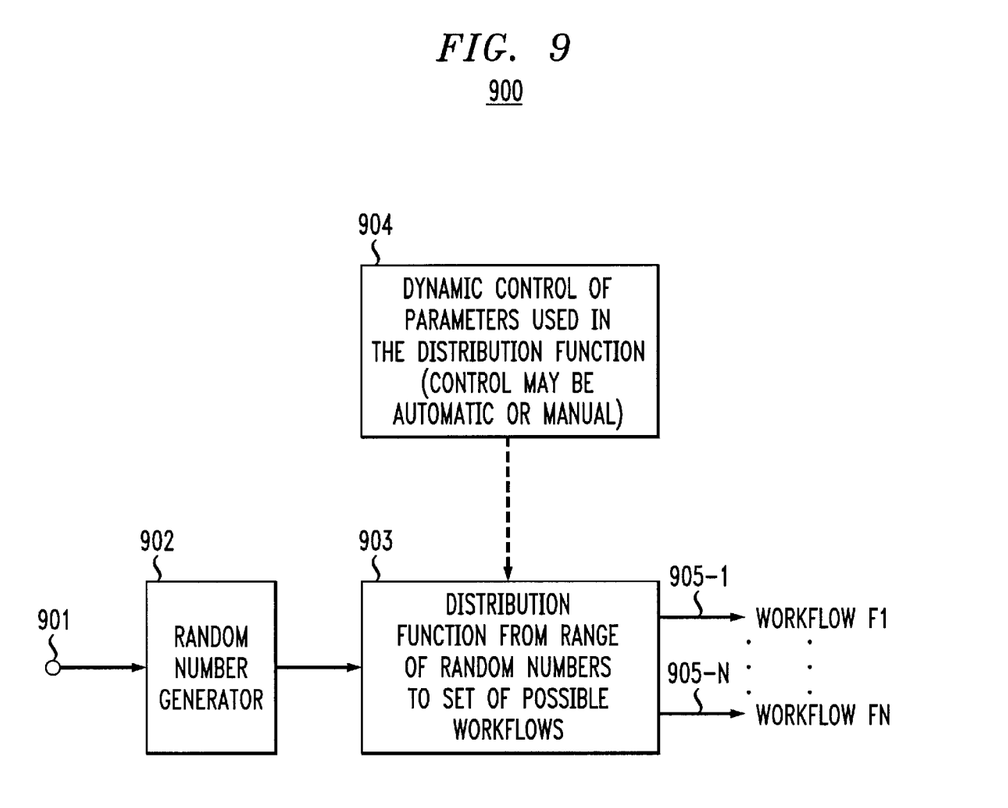
FIG. 9 is a functional diagram illustrating another embodiment of the invention.

As indicated above, the invention can be implemented in many different ways depending on the particular kind of workflow and/or call flow center infrastructure. A particular implementation of the dynamically controlled differentiator of the invention utilizes the notion of employing a "randomized differentiator" functionality into the workflow or call flow. FIG. 9 is a functional diagram illustrating an implementation of an embodiment of the invention including randomized differentiator 900, in accordance with the invention. Specifically, shown, are input 901 to which incoming calls are directed and, then, routed to random number generator 902. Random number generator 902 generates a random number, in well known fashion, and assigns it to an incoming call. Note each individual incoming call gets its own random number assigned to it. In this example, the random number is an integer from 1 to 100. However, any desired lower and upper bound on the integers can be used. The assigned random number is placed into a field of the call object, e.g., the field identified as "call.random_number". Thereafter, the call including its random number is supplied to decision unit 903, which is a distribution function from the range of random numbers to a set of possible workflows F1 through FN, namely 905-1 through 905-N, respectively. Decision unit 903 bases a decision as to how a workflow is selected for the call based on, for example, a predicate over the random number assigned to the call. This predicate might be, for example, "call.random_number$\leq$x", which is a prescribed predicate and where "x" is a prescribed parameter. Parameter control unit 904 provides manual or automatic real-time modification of the parameters used in the selection function. It is noted that randomized differentiator 900 is but one particular implementation of the dynamically controlled differentiator of the invention.

Although the examples described above, utilize only two workflows (call flows) for brevity and clarity of exposition, it will be apparent to those skilled in the art that any desired number of workflows (call flows) may be employed depending on the particular application of the embodiment of the invention.

What is claimed is:

1. A method of handling object instances comprising the steps of:

generating a distinguishing value;

assigning the generated distinguishing value to an object instance;

utilizing said distinguishing value in conjunction with at least one prescribed parameter to select one of a plurality of different treatments to be used in processing said object instance;

processing said object instance in accordance with said selected one of said plurality of treatments;

evaluating the results of said processing to determine whether said prescribed parameter should be adjusted;

if the results of said evaluating indicate that said prescribed parameter is to be adjusted, adjusting said prescribed parameter in accordance with prescribed criteria; and utilizing said adjusted prescribed parameter in conjunction with said distinguishing value to select another one of said plurality of different treatments to be used in processing at least one subsequent object instance.

2. The method as defined in claim 1 wherein said distinguishing value represents the output of a prescribed priority function of said object instances.

3. The method as defined in claim 1 wherein said distinguishing value represents the output of a prescribed function related to a specific type of object instance.

4. The method as defined in claim 1 wherein said object instances are incoming calls.

5. The method as defined in claim 1 wherein said object instances are customer contacts.

6. The method as defined in claim 1 wherein said distinguishing value represents a distinguishing number.

7. The method as defined in claim 1 wherein said step of utilizing said distinguishing value includes the steps of selecting said prescribed parameter, comparing said distinguishing value assigned to said object instance to said prescribed parameter and as a result of said comparing, selecting one of at least two of said treatments to be used in processing said object instance.

8. The method as defined in claim 1 wherein said prescribed parameter is adjusted manually.

9. The method as defined in claim 1 wherein said prescribed parameter is adjusted automatically.

10. The method as defined in claim 9 wherein said step of evaluating includes the steps of accumulating the results of said processing of said object instances, evaluating the accumulated results, as a result of said evaluating, determining whether said prescribed parameter is to be adjusted and, if so, said step of adjusting, adjusts said prescribed parameter in accordance with said prescribed criteria.

11. The method as defined in claim 4 wherein said distinguishing value represents a priority function of said incoming calls, and wherein said step of evaluating includes the steps of selecting a prescribed parameter, comparing said distinguishing value representative of said priority function assigned to said incoming call to said prescribed parameter and as a result of said comparing, selecting one of at least two of said treatments to be used in processing said incoming call.

12. The method as defined in claim 11 wherein said step of evaluating includes the steps of accumulating the results of said processing of said incoming calls, evaluating the accumulated results, as a result of said evaluating said accumulated results, determining whether said parameter is to be adjusted and, if so, said step of adjusting, adjusts said prescribed parameter in accordance with said prescribed criteria.

13. A method of handling object instances comprising the steps of:

generating a distinguishing value;

assigning the generated distinguishing value to an object instance;

utilizing said distinguishing value in conjunction with at least one prescribed parameter to select one of a plurality of different treatments to be used in processing said object instance, wherein said at least one prescribed parameter represents a percentage;

processing said object instance in accordance with said selected one of said plurality of treatments;

evaluating the results of said processing to determine whether said percentage should be adjusted; and if the results of said evaluating indicates that said percentage is to be adjusted, adjusting said percentage in accordance with prescribed criteria.

14. A method of handling object instances comprising the steps of:

generating a distinguishing value, wherein said distinguishing value is a random number;

assigning the generated random number to an object instance;

utilizing said random number in conjunction with at least one prescribed parameter to select one of a plurality of different treatments to be used in processing said object instance;

processing said object instance in accordance with said selected one of said plurality of treatments;

evaluating the results of said processing to determine whether said prescribed parameter should be adjusted; and if the results of said evaluating indicates that said prescribed parameter is to be adjusted, adjusting said prescribed parameter in accordance with prescribed criteria.

15. The method as defined in claim 14 wherein said object instances are incoming calls, and wherein said step of evaluating includes the steps of selecting said prescribed parameter, comparing said random number assigned to said incoming call to said prescribed parameter and as result of said comparing, selecting one of at least two of said treatments to be used in processing said incoming call.

16. The method as defined in claim 15 wherein said step of evaluating further includes the steps of accumulating the results of said processing of said incoming calls, evaluating the accumulated results, as a result of said evaluating, determining whether said prescribed parameter is to be adjusted and, if so, said step of adjusting, adjusts said prescribed parameter in accordance with said prescribed criteria.

17. A method of handling customer contacts comprising the steps of:

determining if a customer contact is of a specific type of customer contact;

generating a distinguishing value;

if said customer contact is of said specific type, assigning the generated distinguishing value to said customer contact;

utilizing said distinguishing value in conjunction with a prescribed parameter to select one of a plurality of different treatments to be used in processing said customer contact;

processing said customer contact in accordance with said selected treatment;

evaluating the results of said processing to determine whether said prescribed parameter should be adjusted; and if the results of said evaluating indicates that said prescribed parameter is to be adjusted, adjusting said prescribed parameter in accordance with prescribed criteria; and utilizing said adjusted prescribed parameter in conjunction with said distinguishing value to select another one of said plurality of different treatments to be used in processing at least one subsequent object instance.

18. The method as defined in claim 17 wherein said customer contacts are incoming calls.

19. The method as defined in claim 17 wherein said distinguishing value represents the output of a prescribed priority function of said incoming call.

20. The method as defined in claim 17 wherein said distinguishing value represents the output of a prescribed function related to a specific type of incoming call.

21. The method as defined in claim 17 wherein said distinguishing value represents a distinguishing number.

22. The method as defined in claim 17 wherein the step of utilizing said distinguishing value includes the steps of comparing said distinguishing value assigned to said specific type of customer contact to said prescribed parameter, and as a result of said comparing, selecting one of at least two of said treatments to be used in processing said specific type of customer contact.

23. The method as defined in claim 22 wherein said step of evaluating includes the steps of accumulating the results of said processing of said specific type of customer contact, evaluating the accumulated results, as a result of said evaluating said accumulated results, determining whether said prescribed parameter is to be adjusted and, if so, said step of adjusting, adjusts said prescribed parameter in accordance with said prescribed criteria.

24. A method of handling customer contacts comprising the steps of:
   determining if a customer contact is of a specific type of customer contact;
   generating a distinguishing value;
   if said customer contact is of said specific type, assigning the generated distinguishing value to said customer contact;
   utilizing said distinguishing value in conjunction with a prescribed parameter to select one of a plurality of different treatments to be used in processing said customer contact, wherein said prescribed parameter represents a percentage;
   processing said customer contact in accordance with said selected treatment;
   evaluating the results of said processing to determine whether said percentage should be adjusted; and
   if the results of said evaluating indicates that said percentage is to be adjusted, adjusting said percentage in accordance with prescribed criteria.

25. A method of handling customer contacts comprising the steps of:
   determining if a customer contact is of a specific type of customer contact;
   generating a distinguishing value, wherein said distinguishing value is a random number;
   if said customer contact is of said specific type, assigning the generated random number to said customer contact;
   utilizing said random number in conjunction with a prescribed parameter to select one of a plurality of different treatments to be used in processing said customer contact;
   processing said customer contact in accordance with said selected treatment;
   evaluating the results of said processing to determine whether said prescribed parameter should be adjusted; and
   if the results of said evaluating indicates that said prescribed parameter is to be adjusted, adjusting said prescribed parameter in accordance with prescribed criteria.

26. The method as defined in claim 25 wherein said object instances are incoming calls, and wherein the step of utilizing includes the steps of comparing said random number assigned to said specific type of incoming call to said prescribed parameter, and as a result of said comparing, selecting one of at least two of said treatments to be used in processing said specific type of incoming call.

27. The method as defined in claim 26 wherein said step of evaluating includes the steps of accumulating the results of said processing of said specific type of incoming calls, evaluating the accumulated results, as a result of said evaluating said accumulated results, determining whether said prescribed parameter is to be adjusted and, if so, said step of adjusting, adjusts said prescribed parameter in accordance with said prescribed criteria.

28. Apparatus for use in a customer care center for handling object instances comprising:
   a generator to generate a distinguishing value;
   an assignor to assign the generated distinguishing value to an object instance;
   a selector responsive to said distinguishing value in conjunction with a prescribed parameter to select one of a plurality of different treatments to be used in processing said object instance;
   a processor to process said object instance in accordance with said selected treatment;
   an evaluator to evaluate the results of said processing to determine whether said prescribed parameter should be adjusted;
   an adjustor responsive to the results of said evaluating to adjust said prescribed parameter in accordance with prescribed criteria; and
   said selector being responsive to said adjusted prescribed parameter in conjunction with said distinguishing value to select another one of said plurality of different treatments to be used in processing at least one subsequent object instance.

29. The invention as defined in claim 28 wherein said distinguishing value represents the output of a prescribed priority function of said object instances.

30. The invention as defined in claim 28 wherein said distinguishing value represents the output of a prescribed function related to a specific type of object instant.

31. The invention as defined in claim 28 wherein said object instances are incoming calls.

32. The invention as defined in claim 28 wherein said object instances are customer contacts.

33. The invention as defined in claim 28 wherein said distinguishing value represents a distinguishing number.

34. The invention as defined in claim 28 wherein said prescribed parameter is adjusted manually.

35. The invention as defined in claim 28 wherein said prescribed parameter is adjusted automatically.

36. The invention as defined in claim 28 wherein said evaluator includes a comparator for comparing said distinguishing value assigned to said object instance to said prescribed parameter, and in responsive to the result of said comparing, said selector selects one of at least two of said treatments to be used in processing said object instance.

37. The invention as defined in claim 36 wherein said evaluator includes an accumulator for accumulating the results of said processing of said object instances, an evaluator for evaluating the accumulated results, apparatus responsive to the result of said evaluating for determining whether said parameter is to be adjusted and, if so, said adjustor adjusting said parameter in accordance with said prescribed criteria.

38. The invention as defined in claim 31 wherein said distinguishing value represents a priority function of said incoming calls, and wherein said selector includes a comparator for comparing said priority function assigned to said incoming call to a prescribed parameter, and as a result of said comparing selects one of at least two of said treatments to be used in processing said incoming call.

39. The invention as defined in claim 38 wherein said evaluator includes an accumulator for accumulating the results of said processing of said incoming calls, evaluates the accumulated results, apparatus responsive to the results of said evaluating for determining whether said parameter is to be adjusted and, if so, said adjustor adjusts said parameter in accordance with said prescribed criteria.

40. Apparatus for use in a customer care center for handling object instances comprising:
    a generator to generate a distinguishing value;
    an assignor to assign the generated distinguishing value to an object instance;
    a selector responsive to said distinguishing value in conjunction with a prescribed parameter to select one of a plurality of different treatments to be used in processing said object instance, wherein said prescribed parameter represents a percentage;
    a processor to process said object instance in accordance with said selected treatment;
    an evaluator to evaluate the results of said processing to determine whether said percentage should be adjusted; and
    an adjustor responsive to the results of said evaluating to adjust said percentage in accordance with prescribed criteria.

41. Apparatus for use in a customer care center for handling object instances comprising:
    a generator to generate a distinguishing value, wherein said distinguishing number is a random number;
    an assignor to assign the generated random number to an object instance;
    a selector responsive to said random number in conjunction with a prescribed parameter to select one of a plurality of different treatments to be used in processing said object instance;
    a processor to process said object instance in accordance with said selected treatment;
    an evaluator to evaluate the results of said processing to determine whether said prescribed parameter should be adjusted; and
    an adjustor responsive to the results of said evaluating to adjust said prescribed parameter in accordance with prescribed criteria.

42. The invention as defined in claim 41 wherein said object instances are incoming calls, and wherein said selector includes a comparator for comparing said random number assigned to said incoming call to said prescribed parameter, and in responsive to the result of said comparing, selects one of at least two of said treatments to be used in processing said incoming call.

43. The invention as defined in claim 42 wherein said evaluator includes an accumulator for accumulating the results of said processing of said incoming call, evaluates the accumulated results, and apparatus responsive to the results of said evaluating for determining whether said prescribed parameter is to be adjusted and, if so, said adjustor adjusts said prescribed parameter in accordance with said prescribed criteria.

44. Apparatus for use in a customer care center for handling customer contacts comprising:
    a detector to determine if a customer contact is of a specific type of customer contact;
    a generator to generate a distinguishing value;
    an assignor, responsive to said customer contact being of said specific type, to assign the generated distinguishing value to said specific type of customer contact;
    a selector responsive to said distinguishing value in conjunction with a prescribed parameter to select one of a plurality of different treatments to be used in processing said specific type of customer contact;
    a processor to process said specific type of customer contact in accordance with said selected treatment;
    an evaluator to evaluate the results of said processing to determine whether said prescribed parameter should be adjusted;
    an adjustor responsive to the results of said evaluating to adjust said prescribed parameter in accordance with prescribed criteria; and
    said selector being responsive to said adjusted prescribed parameter in conjunction with said distinguishing value to select another one of said plurality of different treatments to be used in processing at least one subsequent object instance.

45. The invention as defined in claim 44 wherein said distinguishing value represents the output of a prescribed priority function of said customer contacts.

46. The invention as defined in claim 44 wherein said distinguishing value represents the output of a prescribed function related to a specific type of customer contact.

47. The invention as defined in claim 44 wherein said customer contacts are incoming calls.

48. The invention as defined in claim 44 wherein said distinguishing value represents a distinguishing number.

49. The invention as defined in claim 47 wherein said distinguishing value represents a priority function of said incoming calls, and wherein said selector includes a comparator for comparing said priority function assigned to said incoming call to a prescribed parameter, and in response to the results of said comparing, selecting one of at least two of said treatments to be used in processing said specific incoming call.

50. The invention as defined in claim 49 wherein said evaluator includes an accumulator for accumulating the results of said processing of said incoming calls, evaluates the accumulated results, and apparatus, responsive to the results of said evaluating said accumulated results, for determining whether said prescribed parameter is to be adjusted and, if so, said adjustor adjusts said prescribed parameter in accordance with said prescribed criteria.

51. The invention as defined in claim 44 wherein said prescribed parameter is adjusted manually.

52. The invention as defined in claim 44 wherein said prescribed parameter is adjusted automatically.

53. The invention as defined in claim 52 wherein said evaluator includes an accumulator for accumulating the results of said processing of said customer contacts, evaluates the accumulated results, and apparatus, responsive to the results of said evaluating said accumulated results, for determining whether said parameter is to be adjusted and, if so, said adjustor adjusts said prescribed parameter in accordance with said prescribed criteria.

54. Apparatus for use in a customer care center for handling customer contacts comprising:
   a detector to determine if a customer contact is of a specific type of customer contact;
   a generator to generate a distinguishing value;
   an assignor, responsive to said customer contact being of said specific type, to assign the generated distinguishing value to said specific type of customer contact;
   a selector responsive to said distinguishing value in conjunction with a prescribed parameter to select one of a plurality of different treatments to be used in processing said specific type of customer contact, wherein said prescribed parameter represents a percentage;
   a processor to process said specific type of customer contact in accordance with said selected treatment;
   an evaluator to evaluate the results of said processing to determine whether said percentage should be adjusted; and
   an adjustor responsive to the results of said evaluating to adjust said percentage in accordance with prescribed criteria.

55. Apparatus for use in a customer care center for handling customer contacts comprising:
   a detector to determine if a customer contact is of a specific type of customer contact;
   a generator to generate a distinguishing value, wherein said distinguishing number is a random number
   an assignor, responsive to said customer contact being of said specific type, to assign the generated random number to said specific type of customer contact;
   a selector responsive to said random number in conjunction with a prescribed parameter to select one of a plurality of different treatments to be used in processing said specific type of customer contact;
   a processor to process said specific type of customer contact in accordance with said selected treatment;
   an evaluator to evaluate the results of said processing to determine whether said prescribed parameter should be adjusted; and
   an adjustor responsive to the results of said evaluating to adjust said prescribed parameter in accordance with prescribed criteria.

56. The invention as defined in claim 55 wherein said customer contacts are incoming calls, and wherein said selector includes a comparator for comparing said random number assigned to said incoming call to a prescribed parameter, and in response to the results of said comparing, selecting one of at least two of said treatments to be use in processing said specific incoming call.

57. The invention as defined in claim 56 wherein said evaluator includes an accumulator for accumulating the results of said processing of said incoming calls, evaluates the accumulated results, and apparatus, responsive to the results of said evaluating said accumulated results, for determining whether said prescribed parameter is to be adjusted and, if so, said adjustor adjusts said prescribed parameter in accordance with said prescribed criteria.

58. Apparatus for use in a customer care center for handling object instances comprising:
   means for generating a distinguishing value;
   means for assigning the generated distinguishing value to an object instance;
   means responsive to said distinguishing value in conjunction with a prescribed parameter for selecting one of a plurality of different treatments to be used in processing said object instance;
   means for processing said object instance in accordance with said selected treatment;
   means for evaluating the results of said processing to determine whether said prescribed parameter should be adjusted;
   means responsive to the results of said evaluating for adjusting said prescribed parameter in accordance with prescribed criteria; and
   said means for selecting being responsive to said adjusted prescribed parameter and said distinguishing value to select another one of said plurality of different treatments to be used in processing at least one subsequent object instance.

59. The invention as defined in claim 58 wherein said distinguishing value represents the output of a prescribed priority function of said customer contacts.

60. The invention as defined in claim 58 wherein said distinguishing value represents the output of a prescribed function related to a specific type of customer contact.

61. The invention as defined in claim 58 wherein said object instances are incoming calls.

62. The invention as defined in claim 58 wherein said object instances are customer contacts.

63. The invention as defined in claim 58 wherein said distinguishing value represents a distinguishing number.

64. The invention as defined in claim 58 wherein said means for selecting includes means for comparing said distinguishing value assigned to said object instance to said prescribed parameter, and in response to the result of said comparing, selecting one of at least two of said treatments to be used in processing said object instance.

65. The invention as defined in claim 64 wherein said means for processing further includes means for determining whether said object instance is a specific type of object instance and, if so, processing said object instance in accordance with criteria assigned to said specific type of object instance.

66. The invention as defined in claim 58 wherein said prescribed parameter is adjusted manually.

67. The invention as defined in claim 58 wherein said prescribed parameter is adjusted automatically.

68. The invention as defined in claim 67 wherein said means for evaluating includes means for accumulating the results of said processing of said object instances, evaluating the accumulated results, means responsive to the results of evaluating said accumulated results for determining whether said prescribed parameter is to be adjusted and, if so, said means for adjusting adjusts said prescribed parameter in accordance with said prescribed criteria.

69. The invention as defined in claim 59 wherein said object instances are incoming calls, and wherein said means for selecting includes means for comparing said priority function assigned to said incoming call to a prescribed parameter, and means responsive to the result of said comparing for selecting one of at least two of said treatments to be used in processing said incoming call.

70. The invention as defined in claim 69 wherein said means for processing further includes means for determining whether said incoming call is a specific type of incoming call and, if so, processing said incoming call in accordance with criteria assigned to said specific type of incoming call.

71. The invention as defined in claim 70 wherein said means for evaluating includes means for accumulating the results of said processing of said incoming calls, evaluating the accumulated results, means responsive to the results of said evaluating said accumulated results for determining whether said prescribed parameter is to be adjusted and, if so, said means for adjusting adjusts said prescribed parameter in accordance with said prescribed criteria.

72. Apparatus for use in a customer care center for handling object instances comprising:

means for generating a distinguishing value;

means for assigning the generated distinguishing value to an object instance;

means responsive to said distinguishing value in conjunction with a prescribed parameter for selecting one of a plurality of different treatments to be used in processing said object instance wherein said prescribed parameter represents a percentage;

means for processing said object instance in accordance with said selected treatment;

means for evaluating the results of said processing to determine whether said percentage should be adjusted; and means responsive to the results of said evaluating for adjusting said percentage in accordance with prescribed criteria.

73. Apparatus for use in a customer care center for handling object instances comprising:

means for generating a distinguishing value, wherein said distinguishing number is a random number;

means for assigning the generated random number to an object instance;

means responsive to said random number in conjunction with a prescribed parameter for selecting one of a plurality of different treatments to be used in processing said object instance;

means for processing said object instance in accordance with said selected treatment;

means for evaluating the results of said processing to determine whether said prescribed parameter should be adjusted; and means responsive to the results of said evaluating for adjusting said prescribed parameter in accordance with prescribed criteria.

74. The invention as defined in claim 73 wherein said object instances are incoming calls, and wherein said means for selecting includes means for comparing said random number assigned to said incoming call to a prescribed parameter, and means responsive to the result of said comparing for selecting one of at least two of said treatments to be used in processing said incoming call.

75. The invention as defined in claim 74 wherein said means for processing further includes means for determining whether said incoming call is a specific type of incoming call and, if so, processing said incoming call in accordance with criteria assigned to said specific type of incoming call.

76. The invention as defined in claim 75 wherein said means for evaluating includes means for accumulating the results of said processing of said incoming calls, evaluating the accumulating results, means responsive to the results of said evaluating said accumulated results for determining whether said prescribed parameter is to be adjusted and, if so, said means for adjusting adjusts said prescribed parameter in accordance with said prescribed criteria.

* * * * *